US012670616B2

(12) United States Patent
Araújo et al.

(10) Patent No.: US 12,670,616 B2
(45) Date of Patent: Jun. 30, 2026

(54) CAMERA LOCALIZATION DEVICE, METHOD, AND COMPUTER READABLE MEDIUM

(71) Applicant: Telefonaktiebolaget LM Ericsson (publ), Stockholm (SE)

(72) Inventors: José Araújo, Stockholm (SE); Sebastian Barbas Laina, Stockholm (SE); Paula Carbó Cubero, Sundbyberg (SE); Ananya Muddukrishna, Enskededalen (SE); Ioannis Karagiannis, Kalamata (GR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 323 days.

(21) Appl. No.: 18/274,566

(22) PCT Filed: Feb. 25, 2021

(86) PCT No.: PCT/EP2021/054762
§ 371 (c)(1),
(2) Date: Jul. 27, 2023

(87) PCT Pub. No.: WO2022/179690
PCT Pub. Date: Sep. 1, 2022

(65) Prior Publication Data
US 2024/0087162 A1 Mar. 14, 2024

(51) Int. Cl.
*G06T 7/73* (2017.01)
*G01C 21/30* (2006.01)
(Continued)

(52) U.S. Cl.
CPC ............... *G06T 7/74* (2017.01); *G01C 21/30* (2013.01); *G06T 7/11* (2017.01); *G06T 7/55* (2017.01); *G06T 2207/30244* (2013.01)

(58) Field of Classification Search
CPC . G06T 2207/10028; G06T 2207/30244; G06T 7/11; G06T 7/55; G06T 7/73; G06T 7/74; G01C 21/30
(Continued)

(56) References Cited

U.S. PATENT DOCUMENTS

| | | | |
|---|---|---|---|
| 11,555,903 B1* | 1/2023 | Kroeger | G05D 1/024 |
| 2019/0164346 A1* | 5/2019 | Kim | G06T 15/005 |
| 2021/0142497 A1* | 5/2021 | Pugh | G06T 7/543 |

FOREIGN PATENT DOCUMENTS

CN 111861874 A 10/2020

OTHER PUBLICATIONS

International Search Report and Written Opinion of the International Searching Authority, PCT/EP2021/054762, mailed Dec. 1, 2021, 16 pages.
(Continued)

*Primary Examiner* — Kenny A Cese
(74) *Attorney, Agent, or Firm* — Sage Patent Group

(57) ABSTRACT

A map processing device obtains images from a camera transported with a mobile device, and detects 2D features in the images. At least some of the 2D features detected in the images are densified to generate a densified set of 2D features. Locations of the densified set of 2D features are determined in 3D space using an image-based localization algorithm. A structure-based map comprising depth information from a depth sensor transported by another mobile device is accessed, wherein the depth information includes a set of data points indicating locations in 3D space corresponding to features in the real-world sensed by the depth sensor. The camera transported with the mobile device is localized to the real-world based on matching the locations of the densified set of 2D features in 3D space to the depth information accessed in the structure-based map.

25 Claims, 7 Drawing Sheets

(51) Int. Cl.
 *G06T 7/11* (2017.01)
 *G06T 7/55* (2017.01)
(58) Field of Classification Search
 USPC ........................................................ 382/173
 See application file for complete search history.

(56) References Cited

OTHER PUBLICATIONS

Caselitz, Tim et al., "Monocular Camera Localization in 3D LiDAR Maps," 2016 IEEE/RSJ International Conference on Intelligent Robots and Systems (IROS), Daejeon, Korea, Oct. 9-14, 2016, 6 pages.
Youngji, Kim et al., "Stereo Camera Localization in 3D LiDAR Maps," 2018 IEEE/RSJ International Conference on Intelligent Robots and Systems (IROS), Oct. 1-5, 2018, 8 pages.
Mahmoud, Nader et al., "SLAM based Quasi Dense Reconstructions for Minimally Invasive Surgery Scenes," arXiv:1705.09107v1, Mar. 25, 2017, 5 pages.
Tazir, Mohamed Lamine et al., "CICP: Cluster Iterative Closest Point for Sparse-Dense Point Cloud Registration," Robotics and Autonomous Systems, vol. 108, Oct. 2018, 25 pages.
Mur-Artal, Raul, et al., "ORB-SLAM: a Versatile and Accurate Monocular SLAM System," IEEE Transactions on Robotics, vol. 31, No. 5, Oct. 2015, 17 pages.
Cattaneo, D. et al., "CMRNet: Camera to LiDAR-Map Registration," 2019 IEEE Intelligent Transportation Systems Conference (ITSC), Auckland, New Zealand, 7 pages.
Park, Jinsun et al., "Non-Local Spatial Propagation Network for Depth Completion," Computer Vision—ECCV 2020, Lecture Notes in Computer Science, vol. 12358, 16 pages.
Campos, Carlos et al., "ORB-SLAM3: An Accurate Open-Source Library for Visual, Visual_Inertial and Multi-Map SLAM," arXiv:2007.11898v1, Jul. 23, 2020, 15 pages.
Lu, Yan et al., "Sharing Heterogeneous Spatial Knowledge: Map Fusion Between Asynchronous Monocular Vision and Lidar or Other Prior Inputs," In: Amato, N. et al. (editor), Robotics Research, Springer Proceedings in Advanced Robotics, vol. 10, 2020, 16 pages.
Wikipedia, Point-set registration, downloaded from the Internet on Jul. 18, 2023 from: https://en.wikipedia.org/wiki/Point-set_registration, 12 pages.
Wikipedia, Depth map, downloaded from the Internet on Jul. 18, 2023 from: https://en.wikipedia.org/wiki/Depth_map, 3 pages.
Dube, R. et al.,"SegMap: Segment-based mapping and localization using data-driven descriptors," The International Journal of Robotics Research, arXiv:1909.12837v1, Sep. 27, 2019, 17 pages.

* cited by examiner

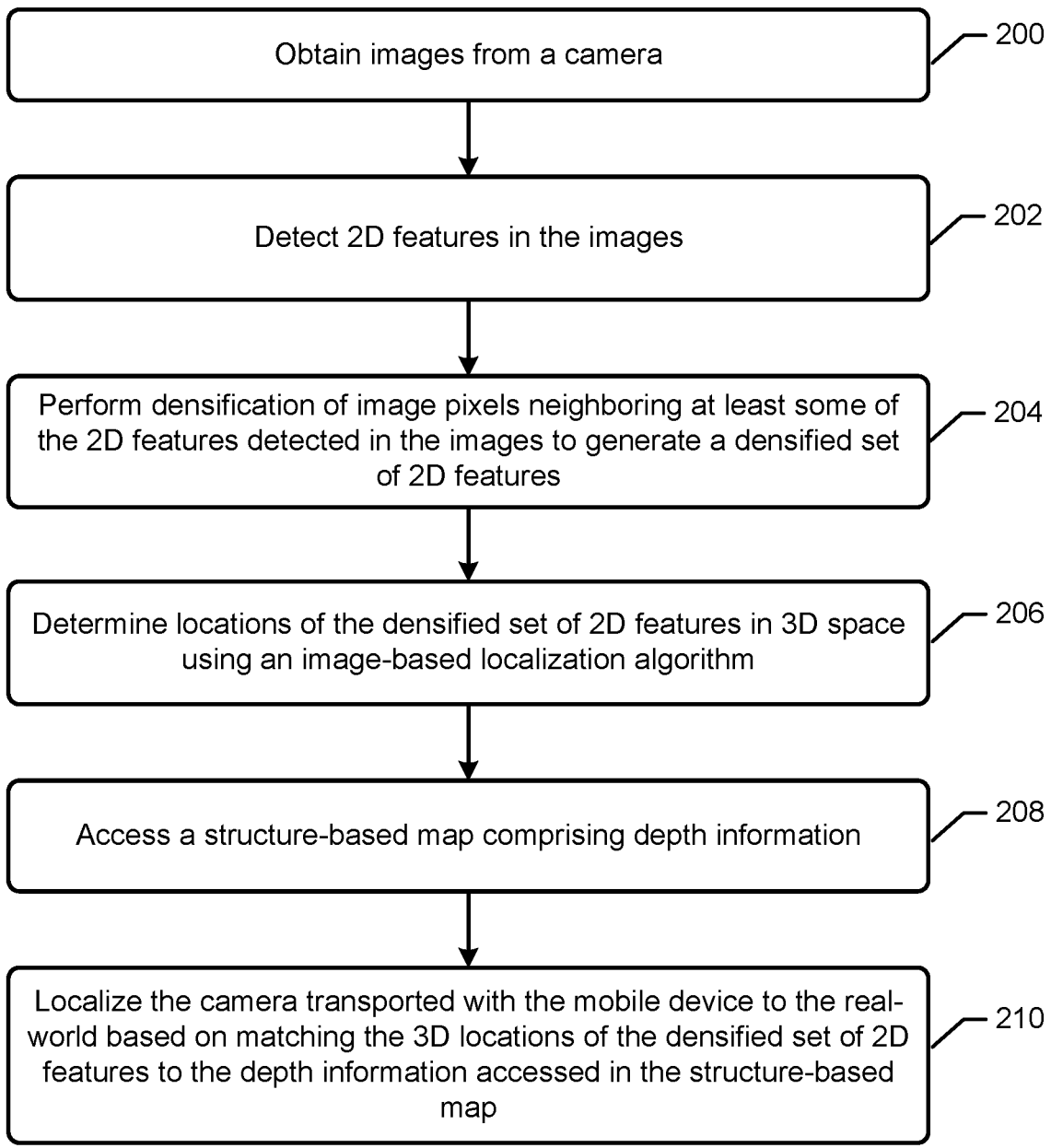

Obtain images from a camera — 200

Detect 2D features in the images — 202

Perform densification of image pixels neighboring at least some of the 2D features detected in the images to generate a densified set of 2D features — 204

Determine locations of the densified set of 2D features in 3D space using an image-based localization algorithm — 206

Access a structure-based map comprising depth information — 208

Localize the camera transported with the mobile device to the real-world based on matching the 3D locations of the densified set of 2D features to the depth information accessed in the structure-based map — 210

Figure 2

Identify keyframe images among the images from the camera (122) — 300

Limit the determination of the locations of the densified set of 2D features in 3D space to being performed on the keyframe images — 302

Figure 3

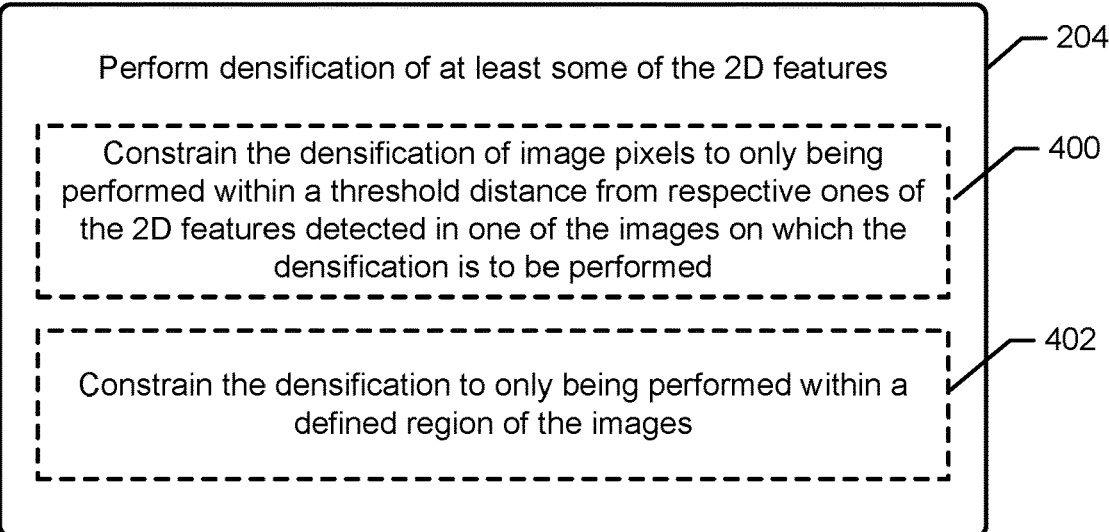

Perform densification of at least some of the 2D features — 204

Constrain the densification of image pixels to only being performed within a threshold distance from respective ones of the 2D features detected in one of the images on which the densification is to be performed — 400

Constrain the densification to only being performed within a defined region of the images — 402

Figure 4

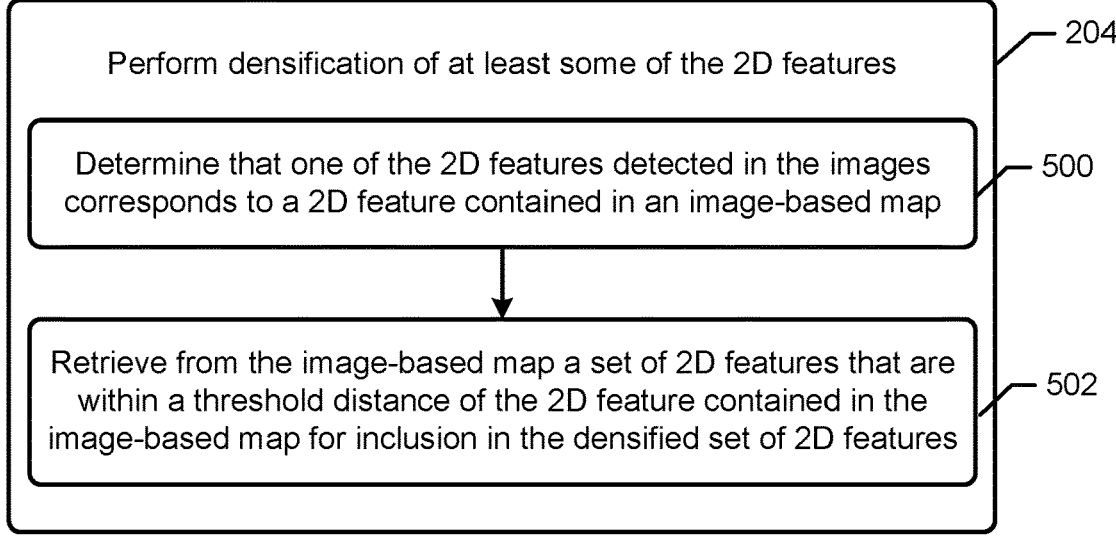

Perform densification of at least some of the 2D features — 204

Determine that one of the 2D features detected in the images corresponds to a 2D feature contained in an image-based map — 500

Retrieve from the image-based map a set of 2D features that are within a threshold distance of the 2D feature contained in the image-based map for inclusion in the densified set of 2D features — 502

Figure 5

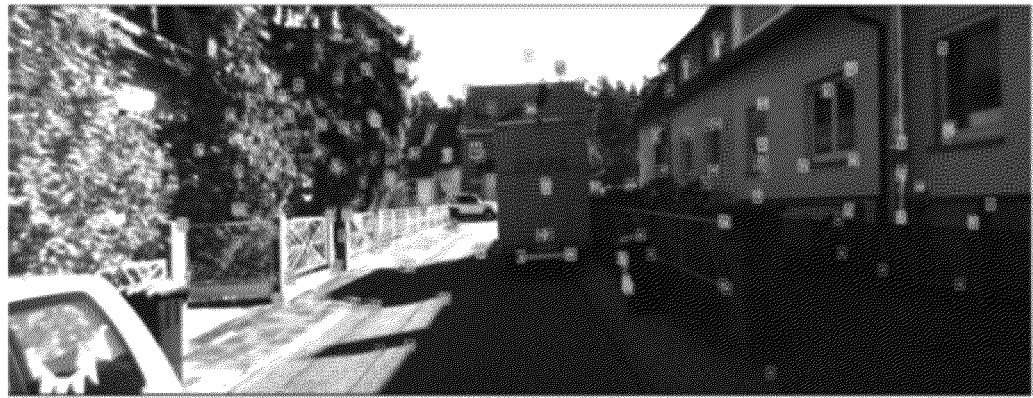
Figure 8
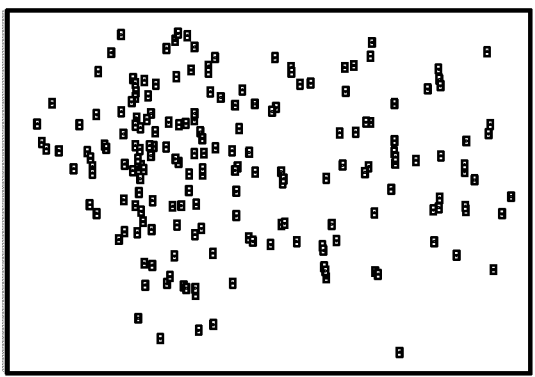
Figure 9A
Figure 9B
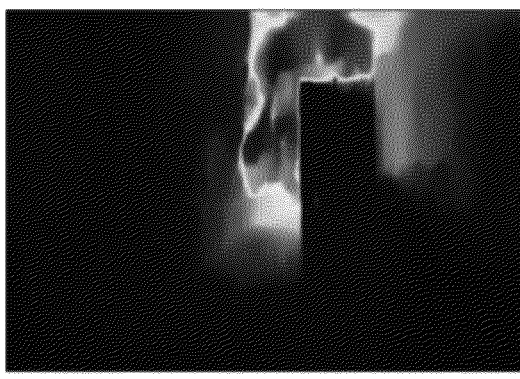
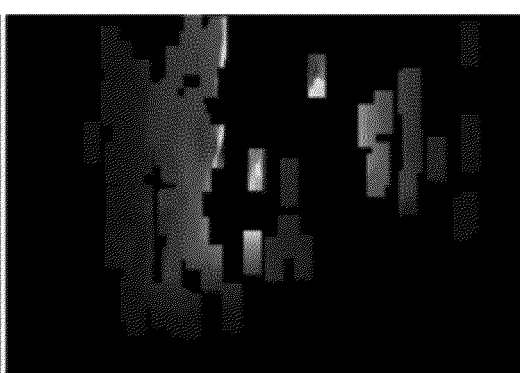
Figure 10A
Figure 10B

CAMERA LOCALIZATION DEVICE, METHOD, AND COMPUTER READABLE MEDIUM

CROSS REFERENCE TO RELATED APPLICATIONS

This application is a 35 U.S.C. § 371 national stage application of PCT International Application No. PCT/EP2021/054762 filed on Feb. 25, 2021, the disclosure and content of which is incorporated by reference herein in its entirety.

TECHNICAL FIELD

The present disclosure relates to a map processing device, a method by a map processing device, and a corresponding computer program product.

BACKGROUND

An important research topic in localization and mapping, also known as Simultaneous Localization and Mapping (SLAM), is performing SLAM with heterogeneous sensor information. It is anticipated that electronic devices will increasingly use heterogeneous sets of sensors to localize device locations relative to maps of the real-world. For example, a basic smartphone performing an augmented reality application may use only a monocular camera for localization. A more advanced smartphone (e.g., Apple iPhone 12 Pro and Ipad 12 Pro) may use a combination of a monocular camera and a Lidar for localization. Still other advanced devices, such as factory robots or mixed reality headsets, may use multiple monocular cameras or stereo cameras and a Lidar for localization.

SLAM algorithms can typically be split into image-based algorithms and structure-based algorithms. The image-based algorithms are configured for localization of devices using images from cameras, which are also referred to as image sensors. In contrast, structure-based algorithms are configured for localization of devices using depth information from a depth sensor which actively senses distance to a real-world feature, such as by bouncing a laser (e.g., Lidar), RF signal (e.g., radar), sound (e.g., ultrasonic sensor), etc. on the feature.

Because of the diverse types of sensors which are being used by devices for localization, situations arise where a device that needs to be localized using an image-based SLAM algorithm does not have access to an existing image-based map for the present device location, although an existing structure-based map does exist for use by structure-based SLAM algorithms. A problem with current SLAM algorithms is that they only work with a single type of sensor, e.g. image-based or structure-based. Recently there have been proposed new solutions to localize a device with an image-based sensor (e.g., monocular or stereo camera) in a map created by a structure-based sensor (e.g., Lidar).

One existing approach for addressing this problem is described in a paper by T. Caselitz, B. Steder, M. Ruhnke, and W. Burgard, "Monocular camera localization in 3D LiDAR maps," 2016 *IEEE/RSJ International Conference on Intelligent Robots and Systems* (*IROS*), Daejeon, Korea (South), pp. 1926-1931, doi: 10.1109/IROS.2016.7759304, IEEE, 2016. This paper proposes to extract the two-dimensional (2D) features from the current image, compute a set of data points indicating locations in 3D space corresponding to the 2D features in the real-world using SLAM, and compute a transformation between the set of 3D data points and a set of data points in a Lidar map, assuming that the location of the device is previously known within the Lidar map up to a small error. This simplifies the problem since the search for similarities between the two sets is constrained to a small range where the authors assume that a correspondence has to be found.

Another approach is described in a paper by D. Cattaneo, M. Vaghi, A. L. Ballardini, S. Fontana, D. G. Sorrenti, and W. Burgard, "CMRNet: Camera to LiDAR-Map Registration," 2019 *IEEE Intelligent Transportation Systems Conference* (*ITSC*), Auckland, New Zealand, pp. 1283-1289, doi: 10.1109/ITSC.2019.8917470, IEEE 2019. This paper proposes a full black box, machine learning (convolutional neural network (CNN)) based approach to convert an image directly into a depth image, and then match such depth image with a Lidar map. Again, the authors assume that the position of the monocular camera device is known up to a value (e.g. four meters in their experiments) with respect to the lidar map which makes the matching of the depth image generated from the monocular image and the Lidar map information simpler to obtain.

Another approach is described in a paper by Y. Lu, J. Lee, S.-H. Yeh, H.-M. Cheng, B. Chen, and D. Song, "Sharing Heterogeneous Spatial Knowledge: Map Fusion Between Asynchronous Monocular Vision and Lidar or Other Prior Inputs", in *Robotics Research. Springer Proceedings in Advanced Robotics*, vol 10, pp. 727-741, Springer, 2020. This paper computes planes in 3D space from a set of data points indicating locations in 3D space corresponding to 2D features identified from the monocular images, and also from the Lidar map information. Then a matching process is performed between the planes, which allows finding a correspondence between two heterogeneous sensor types. However, planes may not always be available in all types of environments limiting the applicability of this solution.

Hence, there is a need to develop more adaptable SLAM algorithms and systems.

SUMMARY

Some embodiments disclosed herein are directed to a map processing device that includes at least one processor. The at least one processor is configured to obtain images from a camera transported with a mobile device, and detect 2D features in the images. The at least one processor performs densification of at least some of the 2D features detected in the images to generate a densified set of 2D features, and determines locations of the densified set of 2D features in 3D space using an image-based localization algorithm. The at least one processor accesses a structure-based map comprising depth information from a depth sensor transported by another mobile device, wherein the depth information comprises a set of data points indicating locations in 3D space corresponding to features in the real-world sensed by the depth sensor. The at least one processor localizes the camera transported with the mobile device to the real-world based on matching the locations of the densified set of 2D features in 3D space to the depth information accessed in the structure-based map.

Some other related embodiments are directed to a method by a map processing device. The method includes obtaining images from a camera transported with a mobile device, and detecting 2D features in the images. The method performs densification of at least some of the 2D features detected in the images to generate a densified set of 2D features, and determines locations of the densified set of 2D features in 3D space using an image-based localization algorithm. The method accesses a structure-based map comprising depth information from a depth sensor transported by another mobile device, wherein the depth information comprises a set of data points indicating locations in 3D space corresponding to features in the real-world sensed by the depth sensor. The method localizes the camera transported with the mobile device to the real-world based on matching the locations of the densified set of 2D features in 3D space to the depth information accessed in the structure-based map.

Some other related embodiments are directed to a computer program product including a non-transitory computer readable medium storing program code executable by at least one processor of a map processing device to perform operations. The operations include obtaining images from a camera transported with a mobile device, and detecting 2D features in the images. The operations perform densification of at least some of the 2D features detected in the images to generate a densified set of 2D features, and determine locations of the densified set of 2D features in 3D space using an image-based localization algorithm. The operations access a structure-based map comprising depth information from a depth sensor transported by another mobile device, wherein the depth information comprises a set of data points indicating locations in 3D space corresponding to features in the real-world sensed by the depth sensor. The operations localize the camera transported with the mobile device to the real-world based on matching the locations of the densified set of 2D features in 3D space to the depth information accessed in the structure-based map.

As will be explained in further detail below, a potential advantage provided by these and other embodiments is that an image-based localization algorithm can be used to process images from a camera transported with a mobile device to localize the camera and, thereby, the mobile device relative to a structure-based map. Therefore, a conventional image-based localization algorithm (e.g., image-based SLAM algorithm) can be used to process camera images for localization relative to a structure-based map. Moreover, by densifying at least some of the 2D features which are detected in the images before determining locations of the 2D features in 3D space using the image-based localization algorithm, the localization can be performed more accurately and computationally efficiently then if a non-densified set of 2D features were attempted to be used for localization relative to the typically higher density depth information contained in the structure-based map.

Other devices, methods, and computer program products according to embodiments will be or become apparent to one with skill in the art upon review of the following drawings and detailed description. It is intended that all such devices, methods, and computer program products be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings:

FIGS. 2 through 7 illustrate flowcharts of operations performed by a map processing device in accordance with some embodiments of the present disclosure;

FIG. 8 illustrates an example camera image from a KITTI dataset and the detected 2D features in the image;

FIG. 9A illustrates the example camera image of FIG. 8 and FIG. 9B illustrates the 2D features points having associated depth values which have been detected in the camera image of FIG. 9A, in accordance with some embodiments of the present disclosure;

FIG. 10A illustrates a full 3D reconstruction of a scene by a depth completion algorithm and FIG. 10B illustrates a partial 3D reconstruction of defined regions of the scene by the depth completion algorithm, in accordance with some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Embodiments of the present disclosure are directed to performing localization of a mobile device with a camera using an image-based localization algorithm to a structure-based map which can be created using a structure-based sensor. The term "camera" used herein refers to any type of image-based sensor, including without limitation a monocular camera, stereo cameras, etc. As will be explained in more detail below, the localization can be performed with increased accuracy using densification operations according to some embodiments, and can be performed in a computationally efficient manner which may enable online localization of mobile devices.

Figure 1:
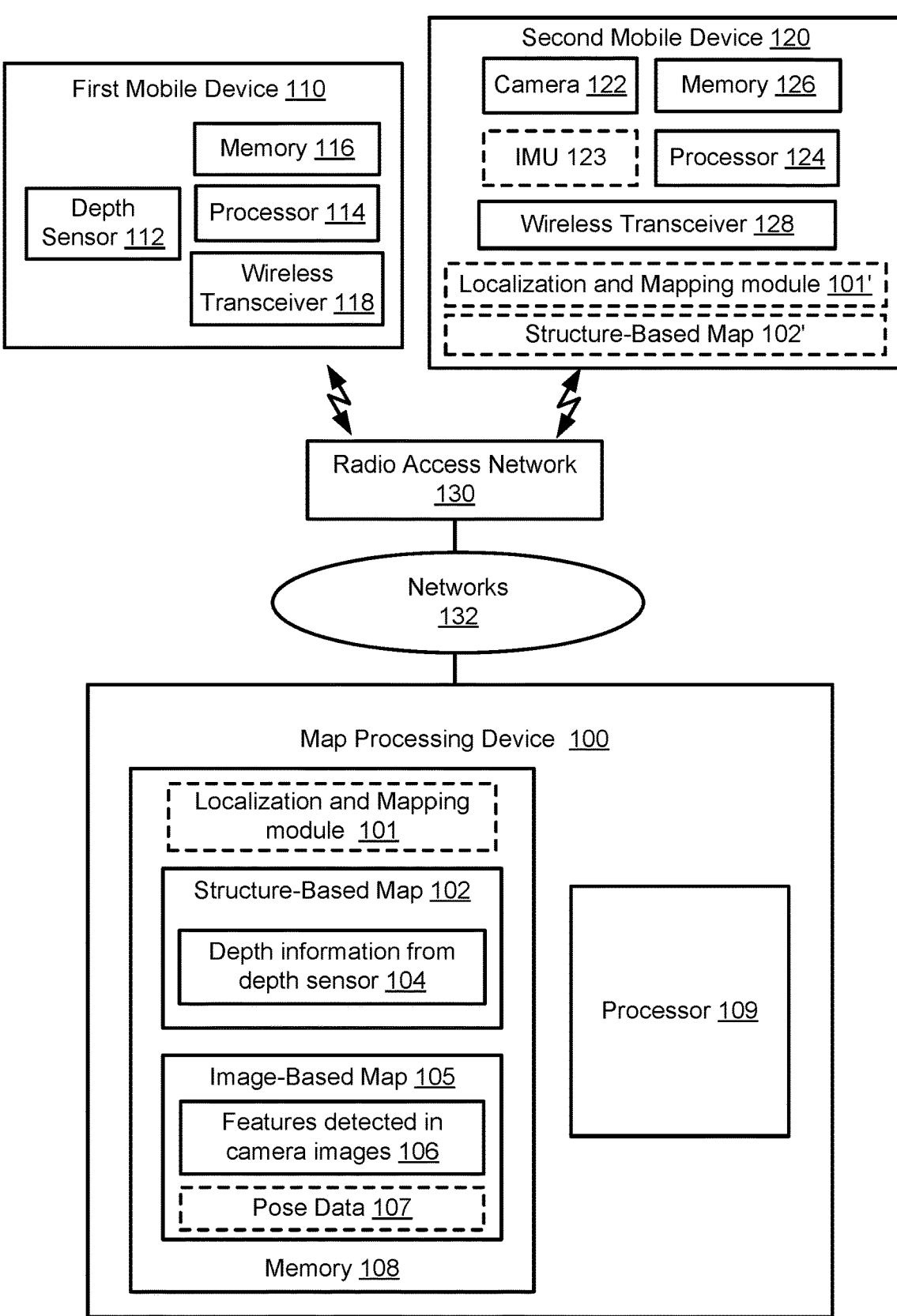
FIG. 1 illustrates a map processing device that localizes a second mobile device using an image-based localization algorithm relative to a structure-based map that was generated using a first mobile device in accordance with some embodiments of the present disclosure.

Some embodiments are now explained in the context of FIG. 1 and an example operational scenario. FIG. 1 illustrates a map processing device 100 that performs mapping (map creation) and may further perform localization for a first mobile device 110 using, e.g., a structure-based localization algorithm such as structure-based SLAM. The map processing device 100 can perform localization and may further perform mapping for a second mobile device 120 using, e.g., an image-based localization algorithm such as image-based SLAM. Communications between the mobile devices 110 and 120 and the map processing device 100 can be performed through one or more radio access network(s) 130 and one or more public, e.g., Internet, and/or private networks 132.

The first mobile device 110 includes a depth sensor 112, at least one processor 114 ("processor"), at least one memory 116 ("memory") storing program code executable by the processor 114, and at least one wireless transceiver 118 ("wireless transceiver") to communicate with the radio access network 130. The depth sensor 112 actively senses distance to a real-world feature, such as by bouncing a laser (e.g., Lidar), RF signal (e.g., radar), sound (e.g., ultrasonic sensor), etc. on the real-world feature. The depth sensor 112 generates depth information which includes a set of data points indicating locations in 3D space corresponding to features in the real-world which are sensed by the depth sensor 112. The depth information is communicated by the wireless transceiver 118 to the map processing device 100. The first mobile device 110 may optionally include an inertial measurement unit (IMU) or other sensor (e.g., wheel odometer) that senses movement for generating pose data indicating poses of the depth sensor 112 when the depth information as captured and/or indicating transformations between the poses of the depth sensor 112 when the depth information was captured.

In the example of FIG. 1, the map processing device 100 includes at least one processor 109 ("processor") and at least one memory 108 ("memory") storing program code executable by the processor 109. The program code can include a localization and mapping module 101 which updates depth information 104 in a structure-based map 102 based on the depth information received from the first mobile device 110.

Alternatively or additionally, operations of the localization and mapping module 101 can be performed by the first mobile device 110 with the map processing device 100 sending a partial map to the first mobile device 110 for processing to perform localization and mapping operations for the first mobile device 110. Still alternatively or additionally, the first mobile device 110 may locally store at least a part of a structure-based map for locally performing localization and mapping operations. Accordingly, the localization and mapping operations can be centrally performed by, e.g., a computing server, performed by distributed mobile devices, or performed by a combination of centrally and distributed.

The localization and mapping module 101 may be further configured to update an image-based map 105 based on the images received from the second mobile device 120. For example, the localization and mapping module 101 may be configured to update features 106 that are detected in images received from a camera 122 of the second mobile device 122 and may further update pose data 107 that is determined from inertial measurement unit (IMU) data received from an IMU 123 of the second mobile device 122. The image-based map 105 is optional because the localization and mapping module 101 may be configured to perform image-based localization operations using images from the second mobile device 120 without keeping (maintaining a programmed association to) the features determined in the images for later use.

The first mobile device 110 may be, for example, a robotic vacuum cleaner or a factory automated guided vehicle (AGV) that travels through a building while providing depth information to the map processing device 100. When the first mobile device 110 is navigating through previously traversed portions of a building the map processing device 100 can process the received depth information through a structure-based SLAM algorithm, e.g., in a structure-based part of the localization and mapping module 101, to localize the first mobile device 110 relative to the depth information 104 in the structure-based map 102. The localization operations may enable the first mobile device 110 to autonomously navigate through the building. Moreover, when the first mobile device 110 is navigating through a newly traversed portion of the building, the map processing device 100 can use the received depth information to augment the depth information 104 stored in the structure-based map 102 for later use to localize the first mobile device 110 while navigating through that portion of the building.

In contrast to the first mobile device 110, the second mobile device 120 does not have a depth sensor. Instead, the second mobile device 120 senses features of the real-world using a camera 122 that captures images as the second mobile device 120 moves. The second mobile device 120 includes the camera 122, at least one processor 124 ("processor"), at least one memory 126 ("memory") storing program code executable by the processor 124, and at least one wireless transceiver 128 ("wireless transceiver") to communicate through the radio access network 130 with the map processing device 100. The second mobile device 120 provides the images to the map processing device 100. In the example of FIG. 1, the map processing device 100 uses an image-based localization algorithm, e.g., image-based SLAM algorithm, to perform localization of the camera 122 and thereby localization of the second mobile device 120 to the real-world using the structure-based map 102 as explained in further detail below. The images may correspond to what are called keyframes, or keyframe images, in SLAM literature. The map processing device 100 may optionally store detected features from the images as feature data 106 in the optional image-based map 105.

The second mobile device 120 may optionally include an IMU 123 or other sensor (e.g., wheel odometer) that senses movement for generating pose data indicating poses of the camera 122 when the images were captured and/or indicating transformations between the poses of the camera 122 when the images were captured. The pose data may be: 1) absolute pose data from which pose transformation data can be derived; and/or 2) relative pose data. The pose of an image may be defined by the six degree of freedom position and orientation of the camera 122 relative to a defined reference frame when the image was captured. The pose data can be provided to the map processing device 100 localization and may optionally be stored as pose data 107 associated with the features 106 in the image-based map 105.

As used herein, the term "pose" refers to the position and/or the rotational angle of a mobile device relative to a defined coordinate system or another mobile device. A pose may therefore be defined based on only the multidimensional position of one mobile device relative to a defined coordinate system or another mobile device, based only on the multidimensional rotational angles of the mobile device relative to a defined coordinate system or another mobile device, or on a combination of the multidimensional position and the multidimensional rotational angles. The term "pose" therefore is used to refer to position, rotational angle, or combination thereof.

The second mobile device 120 may optionally include in local memory a localization and mapping module 101' that can perform at least some of the operations described herein for the localization and mapping module 101 in the map processing device 100. The second mobile device 120 may include in local memory at least a portion of a structure-based map 102' that can comprise depth information 104 such as that described for the structure-based map 102 in the map processing device 100. For example, the map processing device 100 may provide proximately located portions of the depth information from the structure-based map 102 in the map processing device 100 to the structure-based map 102' in the second mobile device 120 for local processing to localize the second mobile device 120 relative to the structure-based map 102'.

The structure-based map 102 and/or the image-based map 105 may be organized as data structures that can be represented as graph structures as is commonly performed in structure-based and image-based SLAM approaches. A graph structure is defined by vertices and edges, where vertices contain the main map information, example of which may include, without limitation: for structure-based SLAM—depth information, point cloud or segment descriptors and their respective poses; or for image-based SLAM—keyframes, 2D features and their respective poses. Edges contain the geometric transformation required to be applied to go from edges connecting vertices which contain overlapping information relating the same location in an environment. For example, a set of features in vertex 1 are the same features observed in vertex 100, so there should be an edge between them. Edges contain the geometric transformation required to be applied to traverse from one vertex to adjacent vertices.

Continuing with the above example operational scenario, the second mobile device 120 may be a mixed reality headset worn by a person who is traveling through the same building as the first mobile device 110. As the second mobile device 120 travels through the building, the localization and mapping module 101 may augment the features 106 and possibly also the pose data 107 in the image-based map 105. The image-based map 105 can then be processed through an image-based localization algorithm of the localization and mapping module 101 to localize the second mobile device 120 within the building.

Device localization can typically be performed more accurately using depth sensors and associated structure-based SLAM algorithms than using cameras and associated image-based SLAM algorithms. However, depth sensors can have a much higher cost and operationally consume more power than cameras. Thus, although the second mobile device 120 may have a lower cost and lower power consumption than the first mobile device 110, the second mobile device 120 may be capable of less accurate localization using an image-based SLAM algorithm processing features 106 of the image-based map 105. It would be advantageous for the second mobile device 120 to be localized using the depth information 104 of the structure-based map 102.

However, the image-based localization algorithm is not configured to be able to directly process the structure-based map 102 to localize the second mobile device 120, or may not be able to computationally efficiently and accurately process the structure-based map 102 to localize the second mobile device 120. Thus, when the first mobile device 110 has assisted the map processing device 100 with mapping a portion of the building updated to the structure-based map 102, the image-based localization algorithm may not be able to directly use the structure-based map 102 to localize the second mobile device 120 within that portion of the building.

Some embodiments of the present disclosure are directed to enabling an image-based localization algorithm to localize the second mobile device 120 based on content of the structure-based map 102.

FIG. 2 illustrates a flowchart of operations performed by the map processing device 100 in accordance with some embodiments of the present disclosure. Referring to FIGS. 1 and 2, the map processing device 100 is configured to obtain 200 images from the camera 122 transported with the second mobile device 120. The map processing device 100 detects 202 2D features and images, and performs 204 densification of image pixels neighboring at least some of the 2D features detected in the images to generate a densified set of 2D features. The map processing device 100 determines 206 locations of the densified set of 2D features in 3D space using an image-based localization algorithm. The map processing device 100 accesses 208 the structure-based map 102 comprising depth information 104 from the depth sensor 112 transported by the first mobile device 110, wherein the depth information comprises a set of data points indicating locations in 3D space corresponding to features in the real-world sensed by the depth sensor 112. The map processing device 100 then localizes 210 the camera 122 transported with the second mobile device 120 to the real-world based on matching the locations of the densified set of 2D features in 3D space to the depth information 104 accessed in the structure-based map 102. Localization of the camera 122 enables localization of the second mobile device 120 to the real-world by use of a geometric transformation of a pose of the camera 122 relative to the second mobile device 120, such as when the camera 122 is spaced apart with a fixed geometric relationship to the second mobile device 120.

The operation to match the locations of the densified set of 2D features in 3D space to the depth information 104 accessed in the structure-based map 102, may include any operation configured to match two sets of information. Example operations can include point set registration or scan matching operations. In computer vision, pattern recognition, and robotics, point set registration, also known as point cloud registration or scan matching, can include the process of finding a spatial transformation (e.g., scaling, rotation and translation) that aligns two sets of information, such as two sets of point clouds. For 2D point set registration used in image processing and feature-based image registration, a point set may be 2D pixel coordinates obtained by feature extraction from an image, for example corner detection.

Operations for detecting 202 the 2D features in the images, determining 206, locations of the densified set of 2D features in 3D space, and then localizing 210 the camera based thereon may be performed using any type of image-based localization algorithm, such as an image-based SLAM algorithm described in a paper by C. Campos, R. Elvira, J. Rodriguez, J. Montiel, and J. Tardos, "Orb-slam3: An accurate open-source library for visual, visual-inertial and multi-map slam", https://arxiv.org/pdf/2007.11898.pdf, 2020. FIG. 8 illustrates an example camera image from a KITTI dataset and the detected 2D features which are illustrated by boxes overlaid on the image.

The operations for detecting 202 the 2D features in the images can create a relatively very sparse depth image of the real-world. For example, FIG. 9A illustrates the example camera image of FIG. 8, and FIG. 9B illustrates the 2D features points having associated depth values which have been detected in the camera image of FIG. 9A, in accordance with some embodiments of the present disclosure.

In some embodiments, the operations for determining 206 the locations of the 2D features in 3D space are limited to being performed on keyframe images instead of, for example, on each image captured by the camera 122. A keyframe image, herein also referred to as keyframe, may correspond to what is defined in various SLAM literature as being an image out of a set of consecutive images which contains an amount of 2D features above a desired threshold and also where the detected 2D features are robust and accurate (i.e. the detectability of the features across multiple consecutive images is consistent and the position of the 2D feature in 3D space has a low variance). Limiting the operations for determining 206 the locations of the 2D features in 3D space can result in the operations being more accurate, robust, and computationally efficient, since they are applied on accurate, robust features from "keyframes" instead of every image.

FIG. 3 illustrates a flowchart of corresponding operations performed by the map processing device 100 for limiting the operations for determining 206 the locations of the 2D features in 3D space in accordance with some embodiments of the present disclosure.

Referring to FIG. 3, the operations identify 300 keyframe images among the images from the camera 122, and limit 302 the determination of the locations of the densified set of 2D features in 3D space to being performed on the keyframe images. In some further embodiments, the identification of a keyframe image is based on at least one of: 1) determining an image has a number of 2D features that is greater than a threshold number, 2) determining an image contains less than a threshold fraction of a number of 2D features which were detected in a preceding keyframe image, 3) determining an image was captured a threshold number of images after a preceding keyframe image was captured, and 4) a camera pose when capturing an image has changed by at least a threshold translation or rotation relative to a previous camera pose when capturing a preceding keyframe image. The "preceding keyframe image" can correspond to an image that was last identified as being a keyframe image from among the images from the camera 122, and which may also be currently used as a keyframe image. The determination of the locations of the densified set of 2D features in 3D space can then be limited to being performed on the keyframe images.

The operations for determining 206 the locations of the 2D features in 3D space utilize the image-based map 105 which is available and adapted for use by the image-based SLAM algorithm. In such case, if a 2D feature detected in the current image is also detected in the image-based map 105 of the real-world, then such information is used to more accurately compute the pose of the camera 122 and also to more accurately compute the position of new 2D features detected in the current image. In the image-based SLAM algorithm described in the paper by Campos et al., an already known 2D feature will be removed from the list of 2D features for the current image. This has however a negative effect on the performance of the algorithm since having fewer features results in a sparser 3D representation of the real-world. Accordingly, in some embodiments when a match between a 2D feature (or a set of 2D features) in the current image and a 2D feature in an image-based map 105 of the real-world occurs, then the operations do not filter away the 2D feature but identify it as a "known 2D feature", as will be described in further detail below regarding some ways of performing densification.

The operation for performing 204 densification of image pixels neighboring at least some of the 2D features detected in the images to generate a densified set of 2D features, can be configured to create a denser 3D representation of the real-world as seen from the camera 122. The densification may operate to create more densified image pixel depth regions around the 2D features. In some embodiments, the densification 204 is performed using a depth completion algorithm or guided depth completion algorithm such as a non-local spatial propagation network (NLSPN) algorithm. An example NLSPN that can be used is described in a paper by J. Park, K. Joo, Z. Hu, C.-K. Liu, and I. So Kweon, "Non-local Spatial Propagation Network for Depth Completion", in *Computer Vision—ECCV* 2020, Lecture Notes in Computer Science, vol. 12358, pp. 120-136, Springer, 2020. Additionally, or alternatively, the densification 204 may be performed using interpolation or extrapolation among image pixels adjacent to a detected 2D feature.

Some further embodiments are directed to improving accuracy and/or computational efficiency of the densification 204 operation by constraining the densification 204 to being performed locally to a detected 2D feature, i.e., perform the densification 204 among image pixels that locally neighbor the detected 2D feature. In one illustrative embodiment shown in FIG. 4, the operation to perform 204 densification of least some of the 2D features includes constraining 400 the densification of image pixels to only being performed within a threshold distance from respective ones of the 2D features detected in one of the images on which the densification is to be performed. The constraining 400 operation may include starting from an image pixel location of one of the 2D features detected in one of the images, and repetitively performing the densification on neighboring image pixels which extend in a sequence away from the image pixel location of the one of the 2D features and which are within a threshold number of image pixel locations from the image pixel location of the one of the 2D features detected in the one of the images.

The constraining 400 operation may include constraining the densification of image pixels to only being performed within defined areas which each have defined dimensions and enclose respective ones of the 2D features detected in the one of the images. For example, the densification 204 can include starting from the image pixel location of a detected 2D feature towards the neighboring image pixels and densifying up to a distance of Z image pixels from the image pixel location of the detected 2D feature. One or more of the areas can be defined to be circular having a defined radius in accordance with one embodiment. Alternatively or additionally, one or more of the areas can be defined to be rectangular with defined edge dimensions in accordance with another embodiment. Dimensions of the defined areas can be adapted based on trial and error, for example by evaluating how accurately the localization 210 is perform for the camera 122 based on different values of the area dimensions.

A reason to perform only local densification is that depth completion operations will introduce increasing errors the further away from the 2D feature the completion is performed. Accordingly, by constraining the densification 204 to only densify "just enough pixels" can reduce or minimize the localization error. Moreover, performing a local densification reduces the computational time and computational resources that are consumed by the densification 204 operation.

FIG. 10A illustrates a full 3D reconstruction of a scene by a depth completion algorithm and FIG. 10B illustrates a partial 3D reconstruction of defined regions of the scene by the depth completion algorithm, in accordance with some embodiments of the present disclosure.

Some embodiments are directed to constraining the densification 204 to be performed only on image pixels neighboring the 2D features which are located within a desired region (min max distance, min max height, min max width, etc.) of an image from the camera 122 location. Estimation of the location of the 2D features by the image-based localization algorithm, e.g., image-based SLAM algorithm, may not be sufficiently accurate for distances which are too close or too far away, too high or too low, or too far on the edges of the image. Also, the estimation of the location of the 2D features may be affected by the brightness of the scene, the presence of dynamic objects and the speed of the first mobile device 120. These and other embodiments may operate to trim the features which are used for localization 210 based on this additional information to improve the localization accuracy and robustness and/or to improve the computational efficiency of the computing resources used in the map processing device 100. These operations can be tuned by trial and error and optimized for the specific characteristics of the camera 122 and the image-based localization algorithm, e.g., image-based SLAM algorithm.

Some operational embodiments are directed to improving accuracy and/or computational efficiency of the densification 204 operation by constraining the densification 204 to provide a desired final density of image pixels neighboring the 2D features. With continuing reference to FIG. 4, the operation to constrain 400 the densification of image pixels to only being performed within a threshold distance from respective ones of the 2D features detected in the one of the images, can include starting from an image pixel location of one of the 2D features detected in one of the images, and repetitively performing the densification on every instance of a defined number of neighboring image pixels along a sequence extending away from the image pixel location of the one of the 2D features and which are within a threshold number of image pixel locations from the image pixel location of the one of the 2D features detected in the one of the images. In a further embodiment, the defined number of neighboring image pixels is determined so that a density of the locations of image pixels in the densified set of 2D features in 3D space satisfies a defined rule for matching a density of the locations in 3D space corresponding to the features indicated by the set of data points in the structure-based map 102.

Thus, for example, the densification can be performed every X pixels (instead of every pixel) starting from a 2D feature location in order to create a region with a desired density W of image pixels, where the desired density W can correspond to the density of the 3D representation obtained from the depth sensor 112 to which the localization 210 is attempting to rely upon. It can be advantageous that the density of the two 3D representations, i.e., the density resulting from the densification 204 and the density of the depth information 104 provided by the depth sensor 112, to be as close as possible.

With continued reference to FIG. 4, some other operational embodiments are directed to improving accuracy and/or computational efficiency of the densification 204 operation by constraining 402 the densification 204 to only being performed within a defined region of the images. The operations may control the defined region to exclude image pixels that are less a threshold number of image pixels away from any edge of the images. The operations may control the defined region to exclude image pixels that are more than a threshold number of image pixels from a center of the images. The location of the defined region within the images may be determined based on feedback of accuracy obtained during the matching of the locations of the densified set of 2D features in 3D space to the depth information 104 accessed in the structure-based map 102.

In some further embodiments, the operations may constrain the densification 204 to only being performed on image pixels neighboring the 2D features which are located within a defined region relative to location of the camera 122. Alternatively or additionally, the operations may constrain the densification 204 to only being performed on the 2D features which satisfy at least one of: being stationary; having movement with speed less than a defined threshold; and having a brightness level that satisfies a brightness threshold.

Some further embodiments are directed to improving accuracy and/or computational efficiency of the densification 204 operation for 2D features which are contained in the image-based map 105 (also referred to as "known 2D features"). In some illustrative embodiments shown in FIG. 5, the operation to perform 204 densification of least some of the 2D features detected in the images to generate the densified set of 2D features, includes determining 500 that one of the 2D features detected in the images corresponds to a 2D feature contained in an image-based map 105, and retrieving 502 from the image-based map 105 a set of 2D features that are within a threshold distance of the 2D feature contained in the image-based map 105 for inclusion in the densified set of 2D features. The determination 500 that one of the 2D features detected in the images corresponds to a 2D feature contained in the image-based map 105 may include determining that a subset of 2D features detected in the images satisfies a defined rule for geometrically matching locations of a subset of 2D features contained in the image-based map 105.

Thus, for example, when a detected 2D feature is a "known 2D feature" because it corresponds to a 2D feature contained in an image-based map 105, the densification 204 can load the densified patch for the known 2D feature from the image-based map 105 instead of performing the densification only on image pixels neighboring the 2D feature. In operation to determine that a 2D feature is a "known 2D feature" isn't necessarily performed based on the individual 2D feature matching one-to-one a 2D feature contained in the image-based map 105, but instead may use a voting operation that seeks to match a set of 2D features detected in an image to a corresponding set of 2D features contained in the image-based map 105, where geometric consistency (e.g., where the relative geometric relations between the matched 2D features is the same) has to be verified (e.g. by a minimum of a defined number N of the 2D features currently detected in the image are geometrically consistent with respect to the defined number N of the 2D features contained in the image-based map 105).

Some further embodiments are directed to selectively discarding a densified set of 2D features based on one or more defined conditions being satisfied.

In one embodiment, following the densification 204, the operations determine whether a variance in depth values between pixels of neighboring 2D features in the densified set of 2D features exceeds a defined threshold. When the variance in depth values exceeds the defined threshold, the operations responsively discard the densified set of 2D features without performing the determination 206 of locations of the densified set of 2D features.

Thus, for example, after the densification 204 has been performed for a 2D feature, the created densified 2D feature can be analyzed to determine the variance between the depth values of image pixels of the densified 2D feature compared to depth values of the image pixels of a neighboring 2D feature. When the variance exceeds the defined threshold, this indicates that the depth completion algorithm determined there is a relatively big jump between the detected 2D feature depth value(s) and the neighbor 2D feature depth value(s), which also indicates that the detected 2D feature may have been incorrectly estimated by the image-based localization algorithm, e.g., image-based SLAM algorithm. Consequently, a region where the depth variance around the 2D feature exceeds the defined threshold should be discarded without further processing to determine locations of the 2D features or to localize the camera 122.

The densified regions (densified set of 2D features) around each 2D feature detected in an image may be stored in the image-based map 105, such as with corresponding 2D feature descriptors and 3D structure, so that the information can be re-used in the future. Advantageously, the storage of the densified regions can be performed on the map vertex of a graph-based map structure, where the vertex contains all the 2D features and densified patches observed from the vertex pose. Thus, in some embodiments, the operations by the map processing device 100 may add to the image-based map 105, 2D feature descriptors 106 for the densified 204 set of 2D features and the locations determined 206 for the densified set of 2D features in 3D space. In this manner, the operations can add to the image-based map 105 based on processing of the images camera 122 being transported with the second mobile device 120.

Some further operational embodiments are directed to improving the computational efficiency by performing incremental segmentation of the depth information 104, stored in the structure-based map 102, sparsifying the incremental segments of the depth information 104, and then performing the localization of the camera 122 to the real-world based on matching the locations of the densified set of 2D features in 3D space to the sparsified incremental segments of the depth information. These and further embodiments are explained in the example context of FIG. 6 which illustrates operations that can be performed by the map processing device 100.

Figure 6:
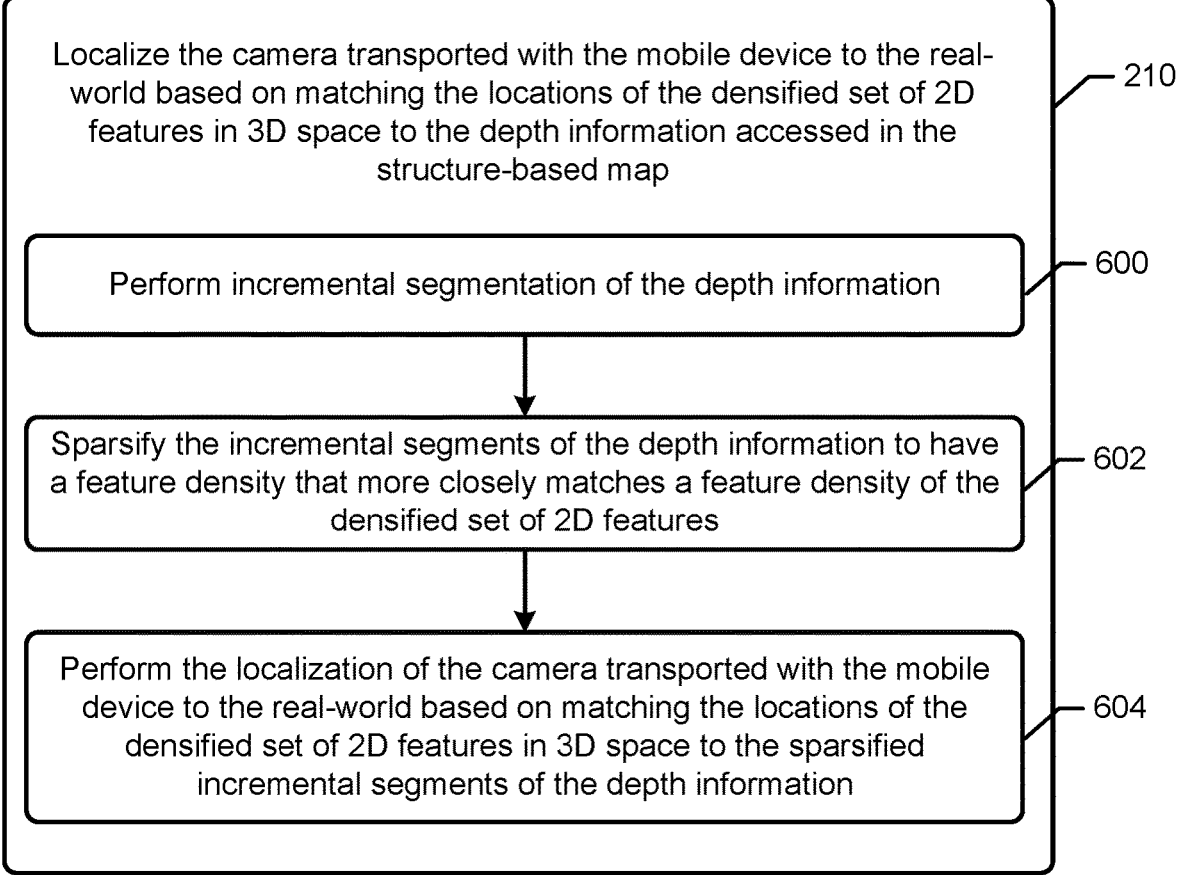

Referring to FIGS. 1 and 6, the operations to localize 210 the camera 122 to the real-world based on matching the locations of the densified set of 2D features in 3D space to the depth information 104 accessed in the structure-based map 102, can include performing 600 incremental segmentation of the depth information 104, stored in the structure-based map 102, to generate incremental segments of the depth information 104. The depth information 104 stored in the structure-based map 102 comprises the set of data points indicating locations in 3D space corresponding to features in the real-world sensed by the depth sensor 112 transported by the first mobile device 110. The operations then sparsify 602 the incremental segments of the depth information 104 to have a feature density that more closely matches a feature density of the densified set of 2D features. The operations then perform 604 the localization of the camera 122 transported with the second mobile device 120 to the real-world based on matching the locations of the densified set of 2D features in 3D space to the sparsified incremental segments of the depth information 104. The operation to sparsify 602 the incremental segments of the depth information 104 to have a feature density that more closely matches a feature density of the densified set of 2D features, can improve the accuracy and/or the computational efficiency (e.g., utilization of processing and memory resources of the map processing device 100) to perform 604 the localization of the camera 122.

Some further embodiments are directed to updating the structure-based map 102 based on processing the images from the camera 122 transported with the second mobile device 120, to provide improved localization capability for the first mobile device 110 using a structure-based localization algorithm, e.g., a structure-based SLAM algorithm. For example, the operations can add to the structure-based map 102 depth information generated from the determined locations of the densified set of 2D features in 3D space. The operations may localize the depth sensor 112 to the real-world based on matching depth information from the depth sensor 112 to the depth information 104 accessed in the structure-based map 102, using a structure-based localization algorithm, e.g., a structure-based SLAM algorithm.

Figures 11A, 11B:
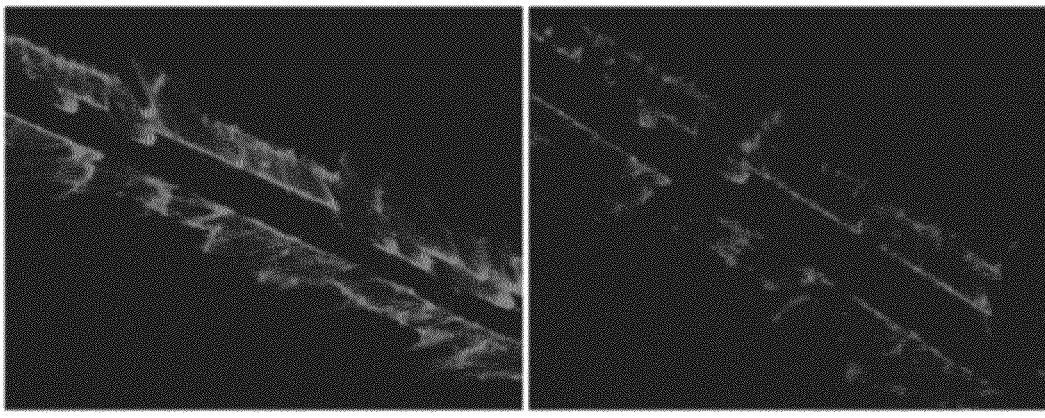
FIG. 11A illustrates depth information before sparsifying and FIG. 11B illustrates the depth information after sparsifying, in accordance with some embodiments of the present disclosure.

The sparsification operation 602 can be particularly beneficial when the 3D representation of the real-world provided by the depth sensor 112 has a higher density than the 3D representation of the real-world provided by the camera 122. FIG. 11A illustrates depth information before sparsifying and FIG. 11B illustrates the depth information after sparsifying, in accordance with some embodiments of the present disclosure. It is noted from comparison of FIGS. 11A and 11B that the sparsification operation retains sufficient depth information to allow the image-based localization algorithm to perform localization with an acceptable accuracy.

Figure 12A:
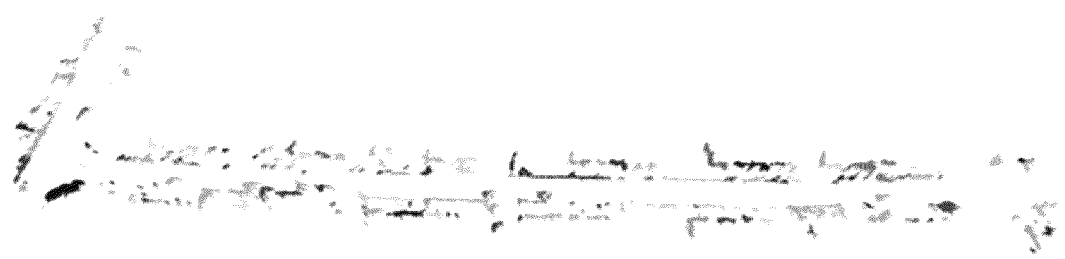
FIG. 12A illustrates incremental segments generated using images from a camera and FIG. 12B illustrates incremental segments generated using a Lidar sensor, in accordance with some embodiments of the present disclosure.
Figure 12B:
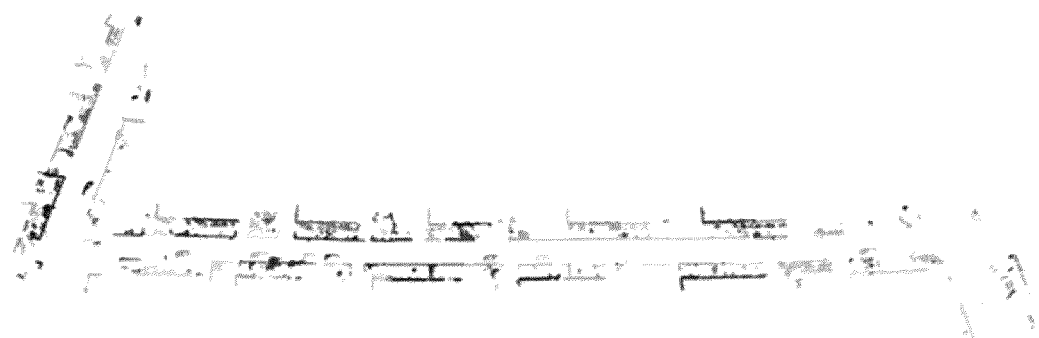

FIG. 12A illustrates incremental segments generated using images from a camera and FIG. 12B illustrates incremental segments generated using a Lidar sensor, in accordance with some embodiments of the present disclosure. It is noted from comparison of FIGS. 12A and 12B that the incremental segments generated using images from the camera 122 can accurately correspond to the incremental segments generated using a Lidar type of depth sensor 112.

Figure 7:
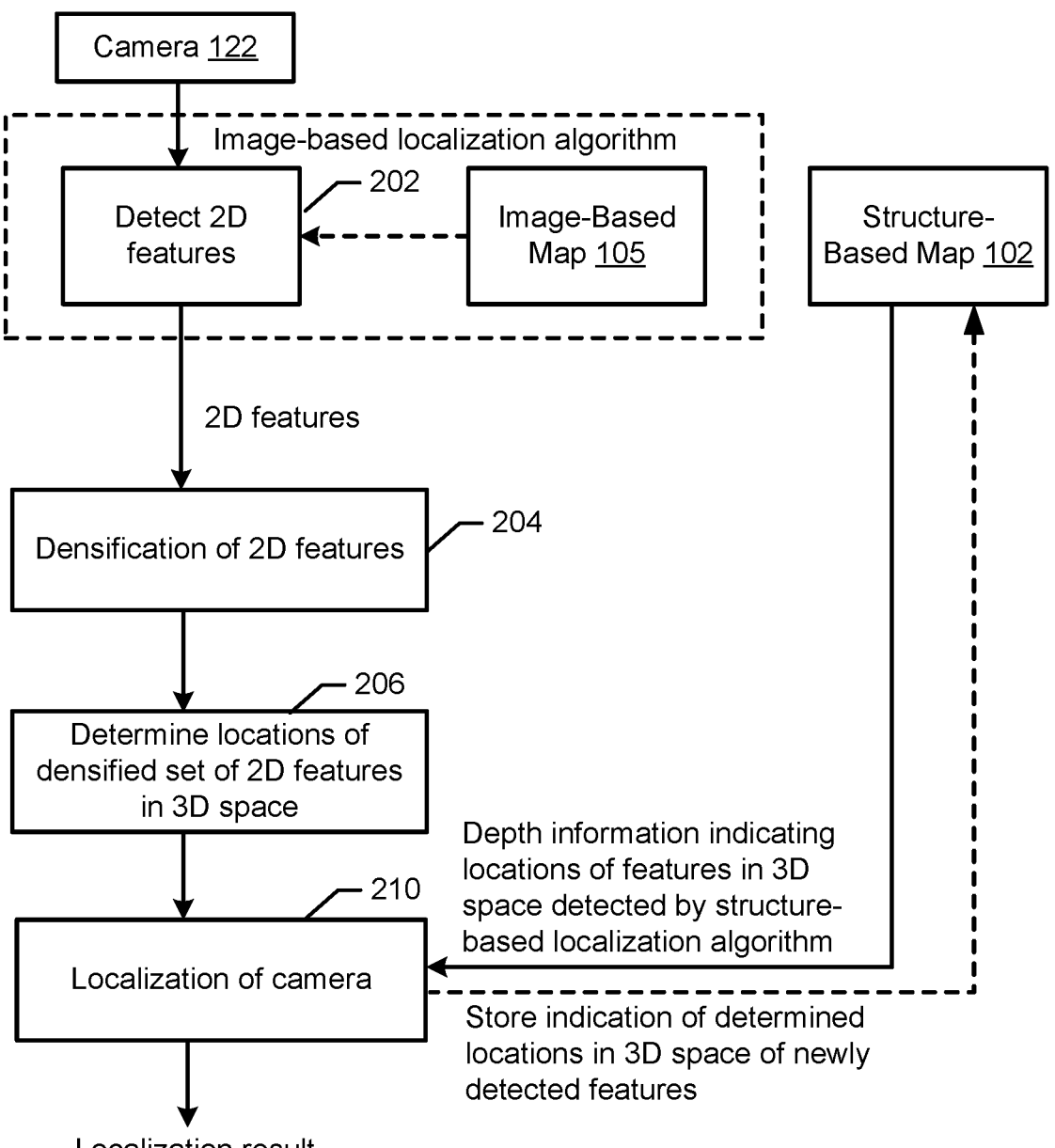

FIG. 7 is a combined block diagram and flowchart of various combinations of operations explained above that can be performed in accordance with some embodiments.

Referring to FIG. 7, images from the camera 122 are processed to detect 202 2D features using an image-based localization algorithm. The 2D feature detection 202 may rely on matching to features 106 in an image-based map 105, when available such as described above for a "known 2D feature." The detected 202 2D features are densified 204. The densified set of 2D features are processed to determine 206 locations of the densified set of 2D features in 3D space using an image-based localization algorithm. The camera 122 is localized to the real-world based on matching the 3D locations of the densified set of 2D features to the depth information 104 accessed in the structure-based map 102. The operations may also store an indication of the determined locations in 3D space of the features detected in the images as updated depth information 104 in the structure-based map 102 for subsequent use for, e.g., localizing the depth sensor 112 transported with the first mobile device 110.

Further definitions and embodiments are now explained below.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id Est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents and shall not be restricted or limited by the foregoing detailed description.

The invention claimed is:

1. A map processing device comprising at least one processor configured to:
   obtain images from a camera transported with a second mobile device;
   detect two-dimensional, 2D, features in the images;
   perform densification of image pixels neighboring at least some of the 2D features detected in the images to generate a densified set of 2D features;
   determine locations of the densified set of 2D features in three-dimensional, 3D, space to generate a camera-derived 3D representation using an image-based localization algorithm;
   access a structure-based map comprising depth information from a depth sensor transported by a first mobile device, wherein the depth information comprises a set of data points indicating locations in 3D space corresponding to features in a real-world sensed by the depth sensor; and
   localize the camera transported with the second mobile device to the real-world based on matching the locations of the densified set of 2D features in 3D space to the depth information accessed in the structure-based map.

2. The map processing device of claim 1, wherein the at least one processor is further configured to:
   identify a keyframe image among the images from the camera, wherein the identification of a keyframe image is based on at least one of: 1) determining an image has a number of 2D features that is greater than a threshold number, 2) determining an image contains less than a threshold fraction of a number of 2D features which were detected in a preceding keyframe image, 3) determining an image was captured a threshold number of images after a preceding keyframe image was captured, and 4) a camera pose when capturing an image has changed by at least a threshold translation or rotation relative to a previous camera pose when capturing a preceding keyframe image; and limit the determination of the locations of the densified set of 2D features in 3D space to being performed on the keyframe images.

3. The map processing device of claim 1, wherein the at least one processor is further configured to:

constrain the densification of image pixels to only being performed within a threshold distance from respective ones of the 2D features detected in one of the images on which the densification is to be performed.

4. The map processing device of claim 3, wherein the at least one processor is further configured to constrain the densification of image pixels to only being performed within a threshold distance from respective ones of the 2D features detected in the one of the images on which the densification is to be performed, by operations comprising:

starting from an image pixel location of one of the 2D features detected in one of the images, repetitively performing the densification on neighboring image pixels which extend in a sequence away from the image pixel location of the one of the 2D features and which are within a threshold number of image pixel locations from the image pixel location of the one of the 2D features detected in the one of the images.

5. The map processing device of claim 3, wherein the at least one processor is further configured to constrain the densification of image pixels to only being performed within a threshold distance from respective ones of the 2D features detected in one of the images on which the densification is to be performed, by operations comprising:

constraining the densification of image pixels to only being performed within defined areas which enclose respective ones of the 2D features detected in the one of the images.

6. The map processing device of claim 5, wherein at least one of the areas is defined to be circular having a defined radius.

7. The map processing device of claim 5, wherein at least one of the areas is defined to be rectangular with defined edge dimensions.

8. The map processing device of claim 3, wherein the at least one processor is further configured to constrain the densification of image pixels to only being performed within a threshold distance from respective ones of the 2D features detected in the one of the images on which the densification is to be performed, by operations comprising:

starting from an image pixel location of one of the 2D features detected in one of the images, repetitively performing the densification on every instance of a defined number of neighboring image pixels along a sequence extending away from the image pixel location of the one of the 2D features and which are within a threshold number of image pixel locations from the image pixel location of the one of the 2D features detected in the one of the images.

9. The map processing device of claim 8, wherein the at least one processor is further configured to determine the defined number of neighboring image pixels so that a density of the locations of image pixels in the densified set of 2D features in 3D space satisfies a defined rule for matching a density of the locations in 3D space corresponding to the features indicated by the set of data points in the structure-based map.

10. The map processing device of claim 1, wherein the at least one processor is further configured to:

constrain the densification of image pixels to only being performed within a defined region of the images.

11. The map processing device of claim 10, wherein the at least one processor is further configured to control the defined region to exclude image pixels that are less than a threshold number of image pixels away from any edge of the images.

12. The map processing device of claim 10, wherein the at least one processor is further configured to control the defined region to exclude image pixels that are more than a threshold number of image pixels from a center of the images.

13. The map processing device claim 10, wherein the at least one processor is further configured to:

determine a location of the defined region within the images based on feedback of accuracy obtained during the matching of the locations of the densified set of 2D features in 3D space to the depth information accessed in the structure-based map.

14. The map processing device of claim 1, wherein the at least one processor is further configured to:

constrain the densification to only being performed on image pixels neighboring the 2D features which are located within a defined region relative to a location of the camera.

15. The map processing device of claim 1, wherein the at least one processor is further configured to:

constrain the densification to only being performed on the 2D features which satisfy at least one of: being stationary; having movement with speed less than a defined threshold; and having a brightness level that satisfies a brightness threshold.

16. The map processing device of claim 1, wherein the at least one processor is further configured to perform the densification of at least some of the 2D features detected in the images to generate the densified set of 2D features, based on:

determining that one of the 2D features detected in the images corresponds to a 2D feature contained in an image-based map; and retrieving from the image-based map a set of 2D features that are within a threshold distance of the 2D feature contained in the image-based map for inclusion in the densified set of 2D features.

17. The map processing device of claim 16, wherein the at least one processor is further configured to determine that one of the 2D features detected in the images corresponds to the 2D feature contained in the image-based map, based on:

determining that a subset of 2D features detected in the images satisfies a defined rule for geometrically matching locations of a subset of 2D features contained in the image-based map.

18. The map processing device of claim 1, wherein the at least one processor is further configured to:

following the densification, determining whether a variance in depth values between pixels of neighboring 2D features in the densified set of 2D features exceeds a defined threshold, and discarding the densified set of 2D features without performing the determination of locations of the densified set of 2D features when the variance is determined to exceed the defined threshold.

19. The map processing device of claim 1, wherein the at least one processor is further configured to use a depth completion algorithm for the densification of image pixels neighboring at least some of the 2D features detected in the images to generate the densified set of 2D features.

20. The map processing device of claim 1, wherein the at least one processor is further configured to:

add to an image-based map 2D feature descriptors for the densified set of 2D features and the locations determined for the densified set of 2D features in 3D space.

21. The map processing device of claim 1, wherein the at least one processor is further configured to localize the camera transported with the second mobile device to the real-world based on matching the locations of the densified set of 2D features in 3D space to the depth information accessed in the structure-based map, based on:

performing incremental segmentation of the depth information, stored in the structure-based map, comprising the set of data points indicating locations in 3D space corresponding to features in the real-world sensed by the depth sensor transported by the first mobile device, to generate incremental segments of the depth information;

sparsifying the incremental segments of the depth information to have a feature density that more closely matches a feature density of the densified set of 2D features; and performing the localization of the camera transported with the second mobile device to the real-world based on matching the locations of the densified set of 2D features in 3D space to the sparsified incremental segments of the depth information.

22. The map processing device of claim 1, wherein the at least one processor is further configured to:

add to the structure-based map depth information generated from the determined locations of the densified set of 2D features in 3D space.

23. The map processing device of claim 22, wherein the at least one processor is further configured to:

localize a depth sensor to the real-world based on matching depth information from the depth sensor to the depth information accessed in the structure-based map.

24. A method by a map processing device comprising:

obtaining images from a camera transported with a second mobile device;

detecting two-dimensional, 2D, features in the images;

performing densification of image pixels neighboring at least some of the 2D features detected in the images to generate a densified set of 2D features;

determining locations of the densified set of 2D features in three-dimensional, 3D, space to generate a camera-derived 3D representation using an image-based localization algorithm;

accessing a structure-based map comprising depth information from a depth sensor transported by a first mobile device, wherein the depth information comprises a set of data points indicating locations in 3D space corresponding to features in a real-world sensed by the depth sensor; and localizing the camera transported with the second mobile device to the real-world based on matching the locations of the densified set of 2D features in 3D space to the depth information accessed in the structure-based map.

25. A computer program product comprising:

a non-transitory computer readable medium storing program code executable by at least one processor of a map processing device to perform operations comprising:

obtaining images from a camera transported with a second mobile device;

detecting two-dimensional, 2D, features in the images;

performing densification of image pixels neighboring at least some of the 2D features detected in the images to generate a densified set of 2D features;

determining locations of the densified set of 2D features in three-dimensional, 3D, space to generate a camera-derived 3D representation using an image-based localization algorithm;

accessing a structure-based map comprising depth information from a depth sensor transported by a first mobile device, wherein the depth information comprises a set of data points indicating locations in 3D space corresponding to features in a real-world sensed by the depth sensor; and localizing the camera transported with the second mobile device to the real-world based on matching the locations of the densified set of 2D features in 3D space to the depth information accessed in the structure-based map.

* * * * *